(12) United States Patent
Kaneko

(10) Patent No.: US 11,861,180 B2
(45) Date of Patent: Jan. 2, 2024

(54) ERROR CORRECTION IN MEMORY SYSTEM

(71) Applicant: KIOXIA CORPORATION, Tokyo (JP)

(72) Inventor: Akiyuki Kaneko, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 2 days.

(21) Appl. No.: 17/680,121

(22) Filed: Feb. 24, 2022

(65) Prior Publication Data

US 2023/0075492 A1 Mar. 9, 2023

(30) Foreign Application Priority Data

Sep. 6, 2021 (JP) .................................. 2021-144690

(51) Int. Cl.
*G06F 12/00* (2006.01)
*G06F 3/06* (2006.01)

(52) U.S. Cl.
CPC .......... *G06F 3/0619* (2013.01); *G06F 3/0655* (2013.01); *G06F 3/0679* (2013.01)

(58) Field of Classification Search
None
See application file for complete search history.

(56) References Cited

U.S. PATENT DOCUMENTS

| 10,901,840 | B2 | 1/2021 | Sharon et al. |
| 10,922,178 | B2 | 2/2021 | Lesartre et al. |
| 11,003,376 | B2 | 5/2021 | Xiao et al. |
| 11,150,842 | B1 * | 10/2021 | Bommana ............. G06F 3/0634 |
| 2013/0262920 | A1 * | 10/2013 | Jung ...................... G06F 3/061 |
| | | | 714/6.22 |

* cited by examiner

*Primary Examiner* — Daniel D Tsui
(74) *Attorney, Agent, or Firm* — Kim & Stewart LLP

(57) ABSTRACT

A memory system includes a plurality of non-volatile memory chips and a controller configured to communicate with a host and control the plurality of non-volatile memory chips. The controller is configured to write a data frame that includes write data and a first parity for error detection and correction of the write data into first memory chips of the non-volatile memory chips in a distributed manner. The first memory chips includes N (N is a natural number of two or more) memory chips. The controller is configured to write a second parity for restoring data stored in one of the N first memory chips using data read from the other N−1 of the N first memory chips, into a second memory chip of the non-volatile memory chips that is different from any of the first memory chips.

17 Claims, 20 Drawing Sheets

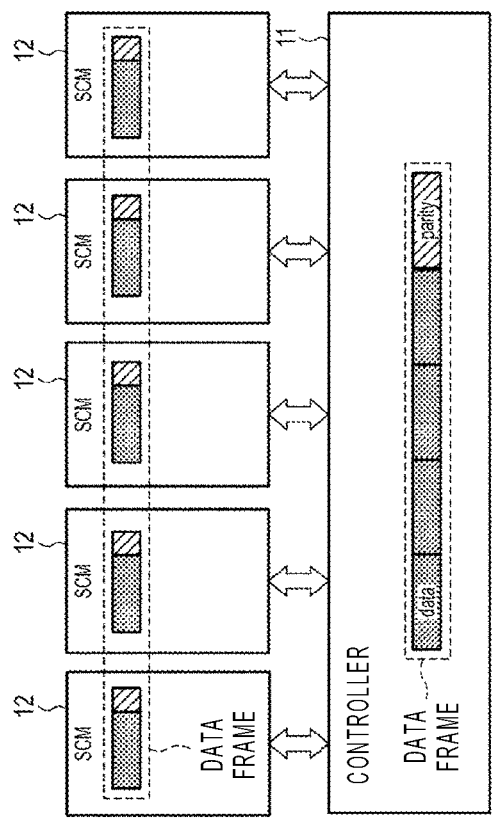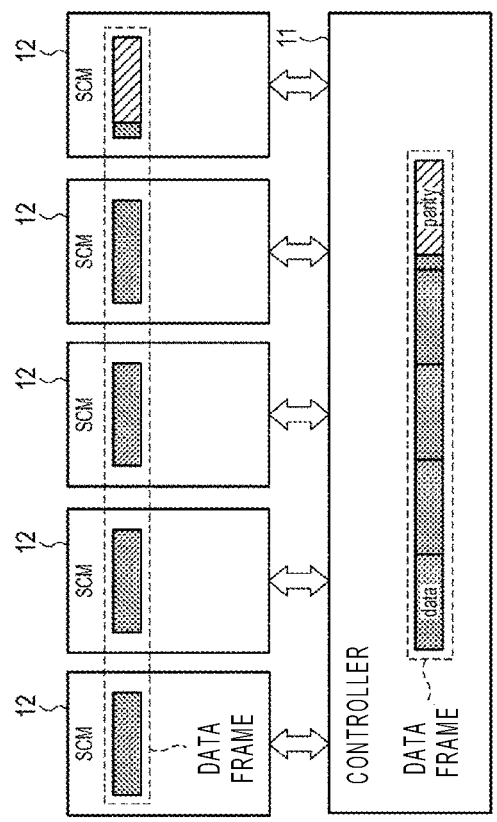

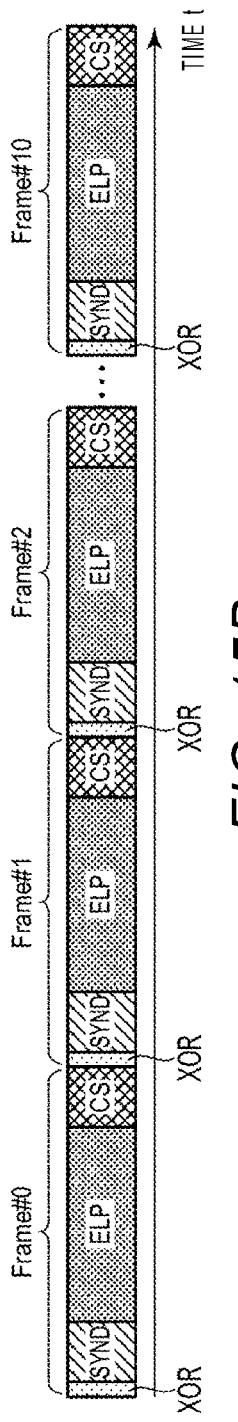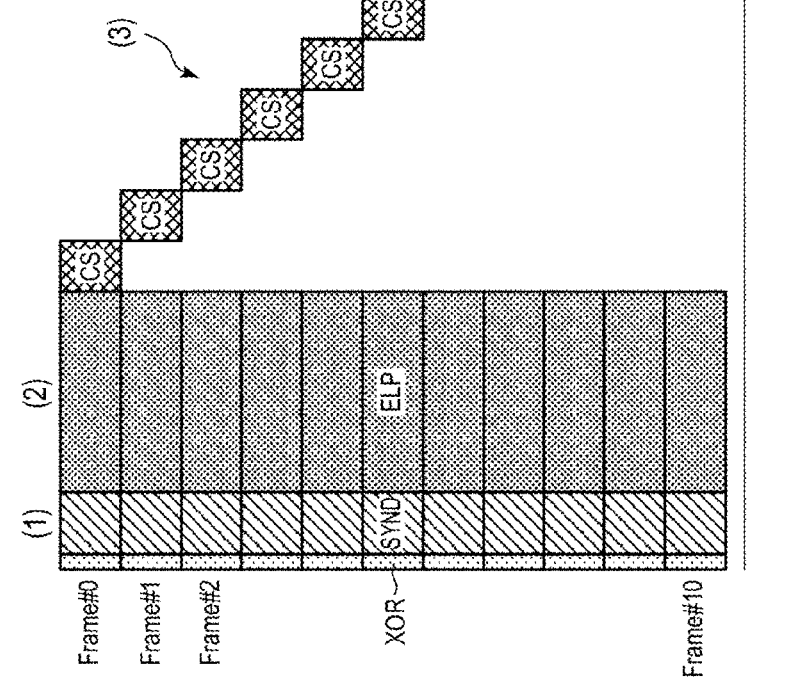

FIG. 17

|     | LATENCY | CIRCUIT SCALE |
|-----|---------|---------------|
| (A) | 1       | 1             |
| (B) | 0.09    | 11.0          |
| (C) | 0.22    | 1.99          |

ERROR CORRECTION IN MEMORY SYSTEM

CROSS-REFERENCE TO RELATED APPLICATION(S)

This application is based upon and claims the benefit of priority from Japanese Patent Application No. 2021-144690, filed Sep. 6, 2021, the entire contents of which are incorporated herein by reference.

FIELD

Embodiments described herein relate generally to a memory system.

BACKGROUND

A storage class memory (SCM) is recently attracting attention as a new type of memory device which complements main memory devices (i.e., primary storage) and storage devices (i.e., secondary storage).

In certain cases, in an SCM module (i.e., a memory system including an SCM and a controller that controls the SCM), a data frame may be written into a plurality of memory chips in a distributed manner in order to reduce latency. The data frame includes data received from a host, and, for example, an error-correcting code (ECC) for detecting and correcting an error of the corresponding data. The data frame is also called an ECC frame.

When a chip failure occurs in any one of memory chips in which the data frame cannot be recovered because the entire portion of the data frame stored in the failed chip is lost and the number of bits lost exceeds an error correction ability of ECC.

BRIEF DESCRIPTION OF THE DRAWINGS

FIGS. 3A and 3B illustrate examples where user data and an error correction bit included in a data frame are arranged in a mixed manner on same non-volatile memory chips.

FIGS. 15A and 15B illustrate an estimate of a latency required for error correction in the worst case.

FIG. 17 illustrates a relationship between the latency and the circuit scale.

DETAILED DESCRIPTION

Embodiments provide a memory system that implements data error correction capable of coping with chip failure while maintaining a low latency.

In general, according to an embodiment, a memory system includes a plurality of non-volatile memory chips and a controller configured to communicate with a host and control the plurality of non-volatile memory chips. The controller is configured to write a data frame that includes write data and first parity for error detection and correction of the write data into first memory chips of the non-volatile memory chips in a distributed manner. The first memory chips includes N (N is a natural number of two or more) memory chips. The controller is configured to write second parity used in restoring data stored in one of the N first memory chips, together with data read from the other N−1 of the N first memory chips, into a second memory chip of the non-volatile memory chips that is different from any of the first memory chips.

Hereinafter, embodiments will be described with reference to the accompanying drawings.

First Embodiment

First, a first embodiment will be described.

Figure 1:
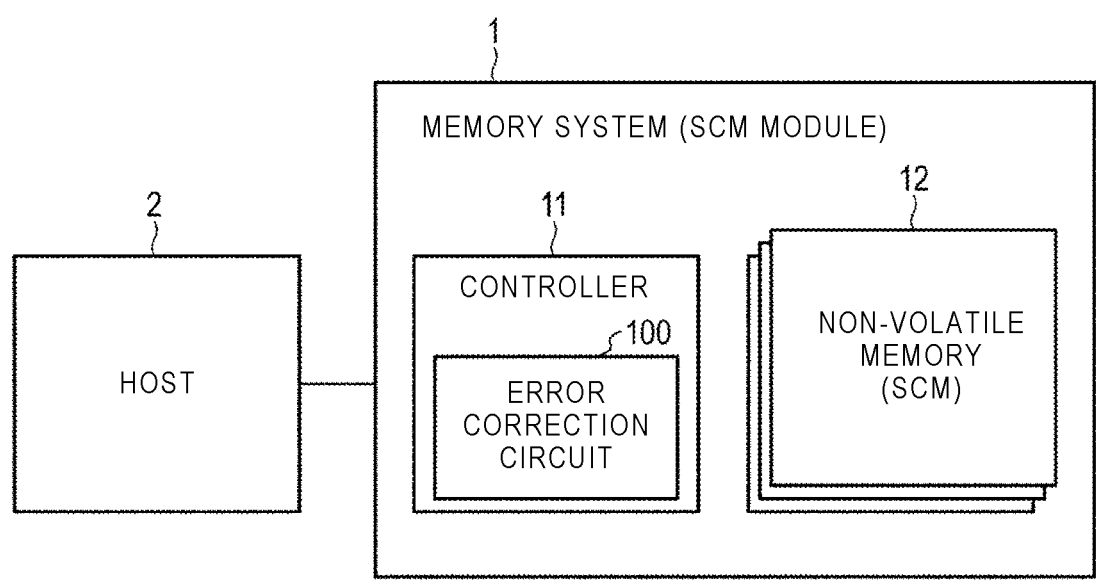
FIG. 1 illustrates a configuration example of a memory system according to a first embodiment.

FIG. 1 illustrates a configuration example of a memory system 1 according to a first embodiment. FIG. 1 also illustrates a configuration example of an information processing system that includes the memory system 1, and a host 2 connected to the memory system 1. The host 2 is an information processing apparatus such as a server or a personal computer.

As illustrated in FIG. 1, the memory system 1 includes a controller 11 and non-volatile memory chips 12.

The controller 11 is a device that controls writing of data into the non-volatile memory chip 12 or reading of data from the non-volatile memory chip 12 in response to a command from the host 2. The controller 11 is configured as, for example, a system-on-a-chip (SoC).

The non-volatile memory chip 12 is, for example, an SCM. The SCM is a phase-change memory (PCM), a magnetoresistive random access memory (MRAM), a resistive RAM (ReRAM), or a ferroelectric RAM (FeRAM). That is, here, an example is illustrated where the memory system 1 is implemented as the SCM module.

The controller 11 includes an error correction circuit 100. A data error may occurs in the non-volatile memory chip 12. The error correction circuit 100 is, for example, a device that detects and corrects an error in read data when the corresponding data is read from the non-volatile memory chip 12. In the memory system 1 according to the first embodiment, regarding a data frame that is written into a plurality of non-volatile memory chips 12 in a distributed manner, data error correction capable of coping with chip failure is implemented by the error correction circuit 100 while low latency of the memory system 1 is maintained. Hereinafter, this point will be described in detail.

Figure 2A:
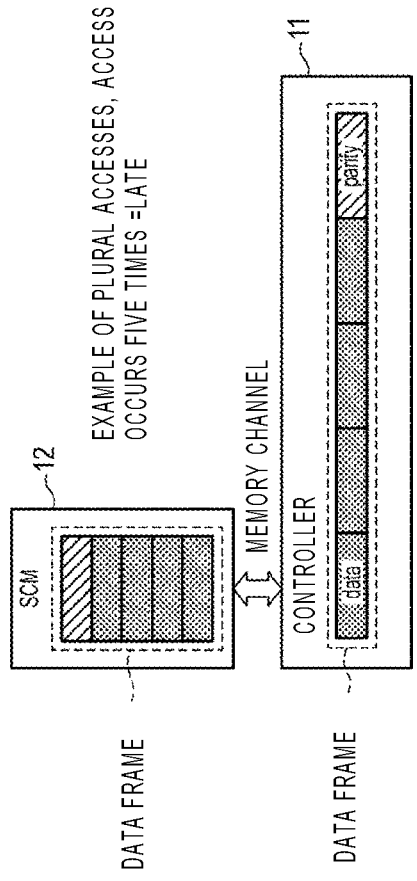
FIGS. 2A and 2B illustrate a method of writing a data frame in one or more non-volatile memory chips of a memory system.

Here, first, descriptions will be made on a comparative method of writing a data frame into the non-volatile memory chips (SCM) 12 in the memory system 1, with reference to FIGS. 2A and 2B.

As described above, a data error may occur in the non-volatile memory chip 12. The controller 11 writes data into the non-volatile memory chip 12 in units of a data frame (ECC frame) in which an error correction bit (ECC parity) is added to the data, referred to herein as user data. At the time of reading of data from the non-volatile memory chip 12, the controller 11 detects an error by using the error correction bit. Then, when an error is detected, the controller 11 executes correction of the corresponding detected error.

In general, a write request from the host 2 is performed for, for example, every 64B (bytes) or 128B. According to this unit, the controller 11 calculates an error correction bit for detecting and correcting an error for, for example, every 64B or 128B of data.

Meanwhile, in certain cases, the minimum access unit of the non-volatile memory chip 12 may be smaller than the size of an access request from the host 2, and may be, for example, 8B, 16B, etc. In this case, as illustrated in FIG. 2A, the controller 11 may perform memory access a plurality of times so as to write data corresponding to the size of the access request from the host 2 (more specifically, a data frame including user data and an error correction bit), into one non-volatile memory chip 12. However, this method is not suitable for a system that requires a low latency performance.

Figure 2B:
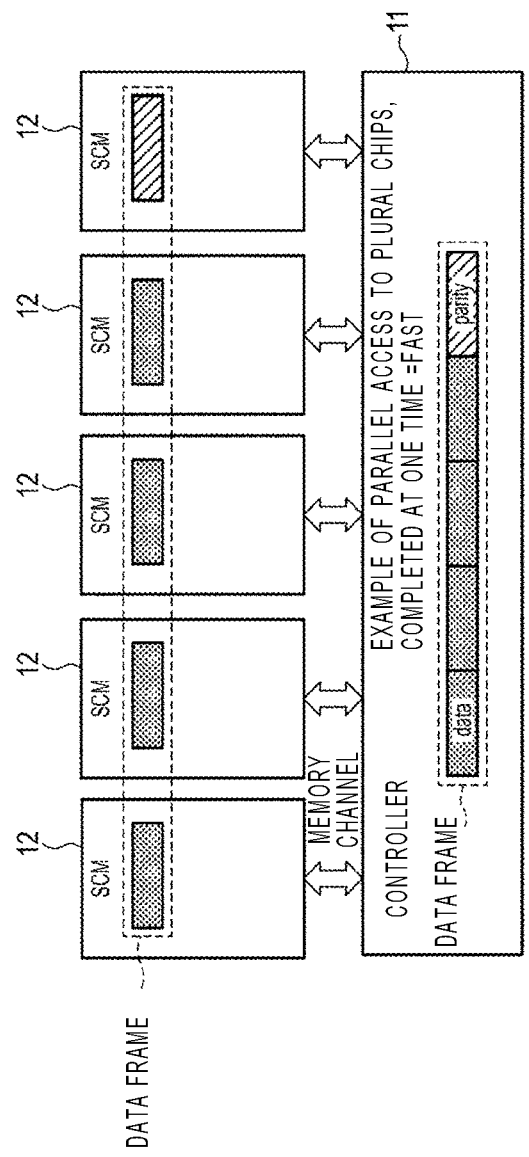

To address such an issue, as illustrated in FIG. 2B, the controller 11 can access the non-volatile memory chips 12 in a parallel manner so as to reduce latency. That is, a method of writing data into the plurality of non-volatile memory chips 12 in a distributed manner is becoming a mainstream. In the memory system 1 according to the first embodiment as well, the controller 11 writes data received from the host 2 (more specifically, a data frame including user data and an error correction bit) into the plurality of non-volatile memory chips 12 in a distributed manner. The user data may be data received from the host 2, or may be data obtained after a predetermined process such as a compression process is executed on data received from the host 2. Data necessary for management in the memory system 1 may be added to the data received from the host 2. That is, the user data may be data obtained based on the data received from the host 2, data including data based on the data received from the host 2, or any data that needs to be written into the plurality of non-volatile memory chips 12 when a write request is received from the host 2, and the user data may be referred to as write data.

In the example illustrated in FIG. 2B, the user data (data) and the error correction bit (ECC parity) are separately arranged in different non-volatile memory chips 12, but may be mixed on the same non-volatile memory chip 12. FIGS. 3A and 3B illustrate examples where user data and an error correction bit are arranged in a mixed manner in one or more non-volatile memory chips 12.

FIG. 3A illustrates an example where in addition to user data, an error correction bit is also written into the non-volatile memory chips 12 in a distributed manner. Meanwhile, FIG. 3B illustrates an example where an error correction bit is collectively written into an area remaining after an end portion of user data is written, so that the user data and the error correction bit are mixed in the same non-volatile memory chip 12. Since the controller 11 manages storage locations of user data and an error correction bit, the arrangement of the user data and the error correction bit on the plurality of non-volatile memory chips 12 is not limited to the examples illustrated in FIG. 2B and FIGS. 3A and 3B, and may be performed in various ways.

Figure 4:
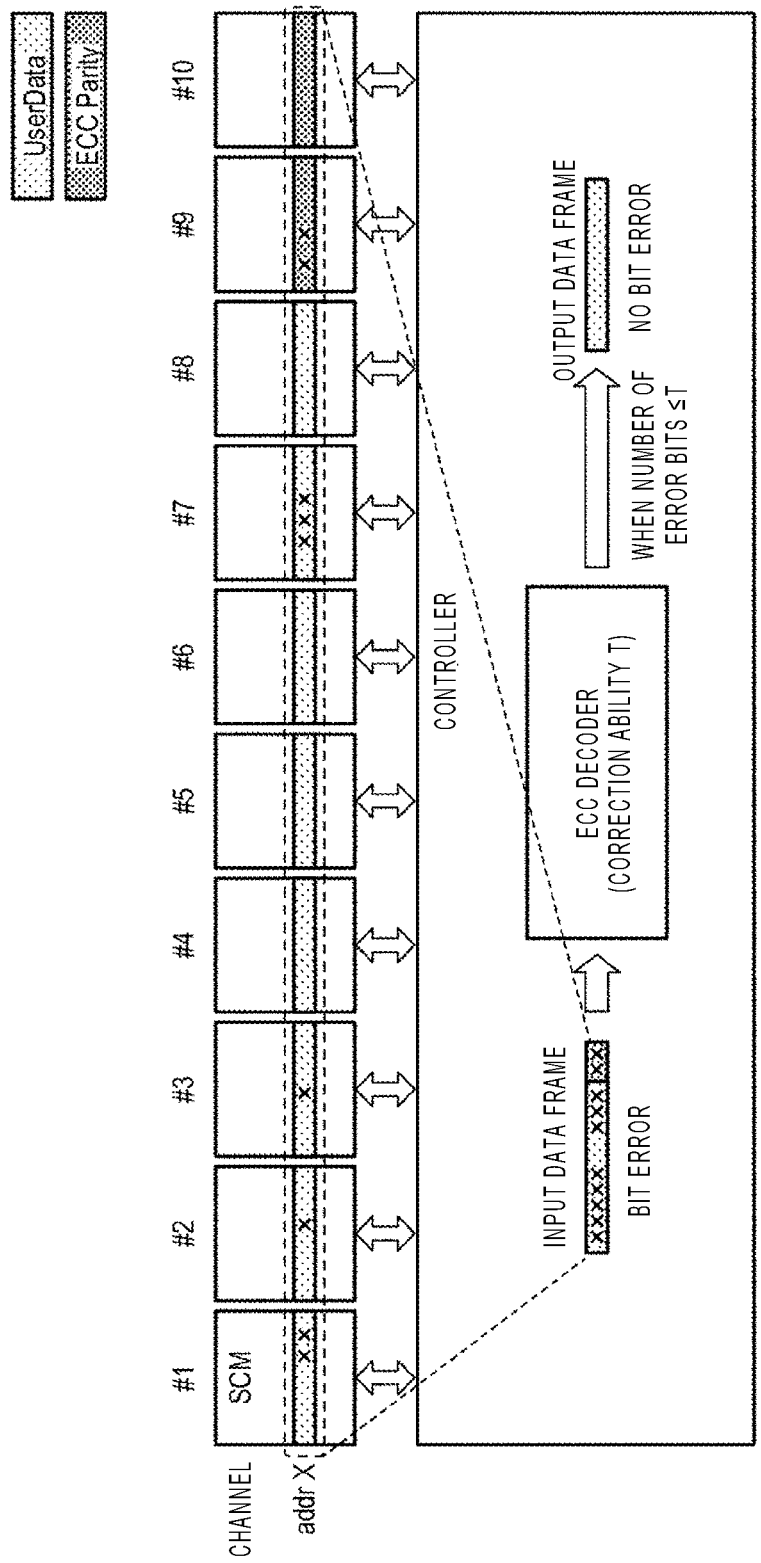
FIG. 4 illustrates a first problem of a comparative example in which a data frame is written into a plurality of non-volatile memory chips in a distributed manner.
Figure 5:
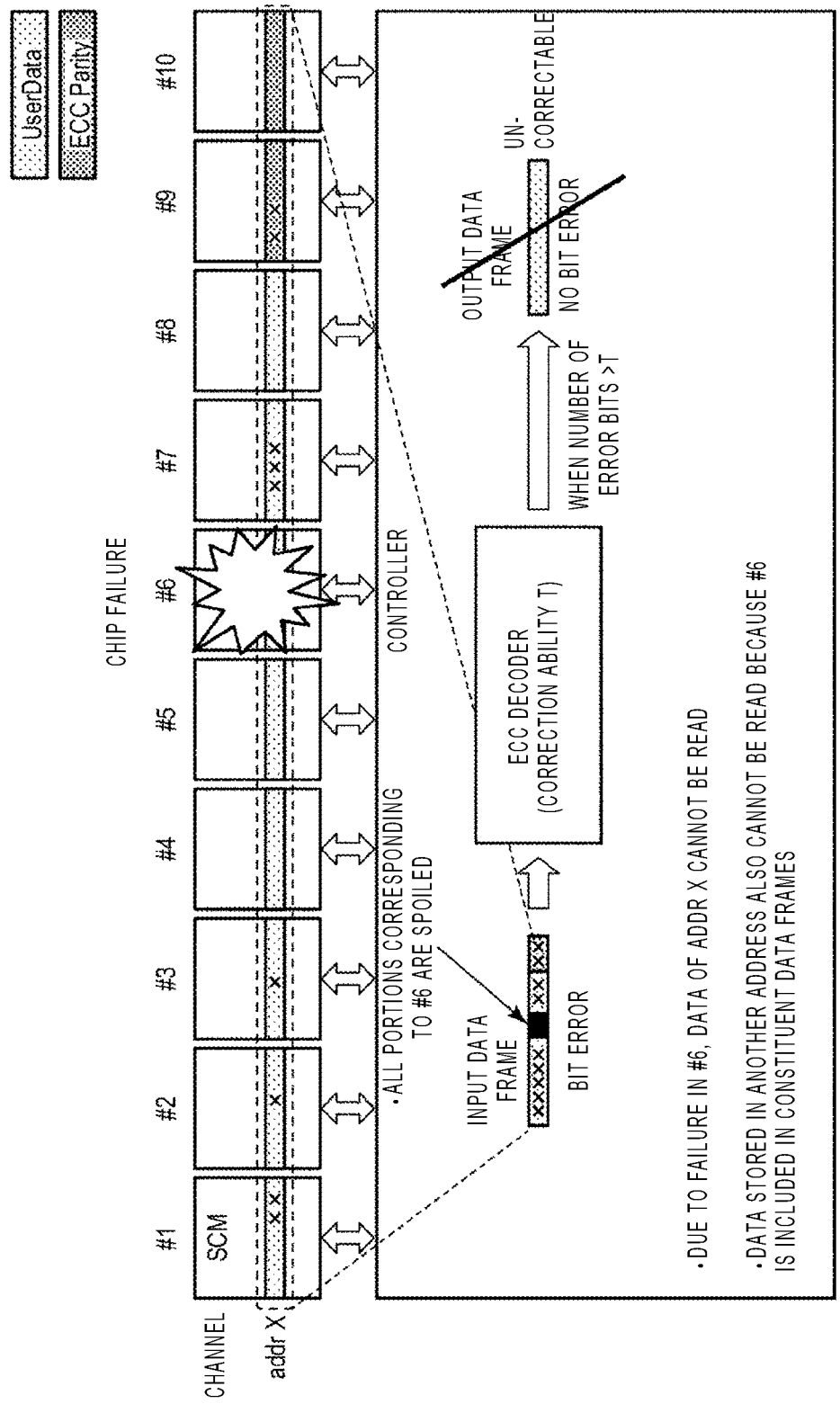
FIG. 5 illustrates a second problem of a comparative example in which a data frame is written into a plurality of non-volatile memory chips in a distributed manner.

Next, FIGS. 4 and 5 illustrate comparative examples, and descriptions will be made on problems when a data frame is written into a plurality of non-volatile memory chips in a distributed manner.

FIG. 4 illustrates a state where a data frame including user data and an error correction bit (ECC Parity) is written into 10 non-volatile memory chips connected to 10 channels #1 to #10, respectively, in a distributed manner. The channels #1 to #10 include communication lines (memory bus) by which a controller communicates with the non-volatile memory chips. To each of the channels #1 to #10, one or more non-volatile memory chips are connected.

For example, when a read command is received from a host, the controller executes reading of data from non-volatile memory chips on the basis of a logical address specified by the read command. Here, exemplified is a case where a data frame including data corresponding to an address X (addr X) is read from 10 non-volatile memory chips. T is an error correction ability of an ECC decoder that corrects error bits in the data frame by using an error correction bit included in the corresponding data frame. The error correction ability T is generally about several bits to several tens of bits.

Therefore, even when there is a bit error in a data frame (or an input data frame) read from the 10 non-volatile memory chips, when the number of error bits of the entire data frame is equal to or less than the error correction ability T of the ECC decoder (i.e., when the number of error bits $\leq T$), a data frame (or an output data frame) in which the corresponding error bits are corrected and no bit error is present may be obtained.

Meanwhile, like FIG. 4, FIG. 5 illustrates a case where a data frame including data corresponding to an address X (addr X) is read from 10 non-volatile memory chips, in which a chip failure occurs in one of the 10 corresponding non-volatile memory chips. The failed chip is a non-volatile memory chip connected to a channel #6.

When a chip failure occurs, a portion of the data frame corresponding to the failed chip is entirely lost. Thus, the corresponding portion becomes error bits, and the error bits of the entire data frame largely exceed the error correction ability T of the ECC decoder. Therefore, correction using an error correction bit is no longer possible.

When all data frames, not only the data frame including the data corresponding to the address X, are written into the 10 non-volatile memory chips including the corresponding failed chip in a distributed manner, all data in an SCM module may be lost. As the number of non-volatile memory chips on which data frames are written in the distributed manner increases, the risk of data loss increases.

On the basis of these comparative examples, next, descriptions will be made on a method of distributed writing in the memory system 1 according to the first embodiment, with reference to FIG. 6.

In the memory system 1 according to the first embodiment, the controller 11 writes a data frame including an error correction bit into the plurality of non-volatile memory chips 12 in a distributed manner, and moreover, further writes bit XOR (XOR parity) of the corresponding entire data frame on a separate non-volatile memory chip 12 from the plurality of non-volatile memory chips 12 into which the data frame is written. Here, in addition to the 10 channels #1 to #10, to which the 10 non-volatile memory chips 12 on which the data frame is distributed arranged are connected, a channel #11 to which the non-volatile memory chip 12 on which the XOR parity is written is connected is newly prepared. Hereinafter, the channel to which the non-volatile memory chip 12 on which the XOR parity is written is connected may be referred to as an XOR channel. Writing the XOR parity into the non-volatile memory chip 12 connected to the XOR channel may be referred to as writing the XOR parity into the XOR channel.

When writing a data frame into the non-volatile memory chips 12, the controller 11 writes the XOR parity of the corresponding data frame via the XOR channel. Meanwhile, when a data frame is read from the non-volatile memory chips 12, and when a chip failure occurs in any of the non-volatile memory chips 12, the controller 11 (more specifically, the error correction circuit 100) restores data read from the failed chip, using data read from the non-volatile memory chips 12 (on which the data frame is distributed) excluding the failed chip, and data read from the non-volatile memory chip 12 into which the XOR parity is written. Here, the data read from the non-volatile memory chip 12 as the failed chip connected to the channel #6 is restored from the data (the data frame) read from the non-volatile memory chips 12 connected to the channels #1 to #5 and #7 to #10, and the data read from the non-volatile memory chip 12 connected to the channel #11 (XOR parity). That is, in the memory system 1 according to the first embodiment, the error correction circuit 100 of the controller 11 includes an XOR restoration circuit 102 in addition to an ECC decoder 101. When a chip failure occurs in the non-volatile memory chip 12 connected to the XOR channel (here, the channel #11), loss of the data frame does not occur. Thus, a subsequent process including detection and correction of error bits may be continued.

There is a possibility that a bit error may also be present in the data frame whose portion of data read from the failed chip is restored by using the XOR parity. When the number of error bits of the entire data frame is equal to or less than the error correction ability T of the ECC decoder 101 (i.e., when the number of error bits ≤T), the error correction circuit 100 may obtain a data frame (an output data frame) in which the corresponding error bits are corrected and no bit error is present.

Restoring a missing portion in a data frame by using the XOR parity may be applied to not only the failure of the entire non-volatile memory chip 12 but also a case where only a limited area within the non-volatile memory chip 12 is failed. That is, the chip failure referred to here includes not only the failure of the entire memory chip, but also the failure of only the limited area in the memory chip.

Figure 6:
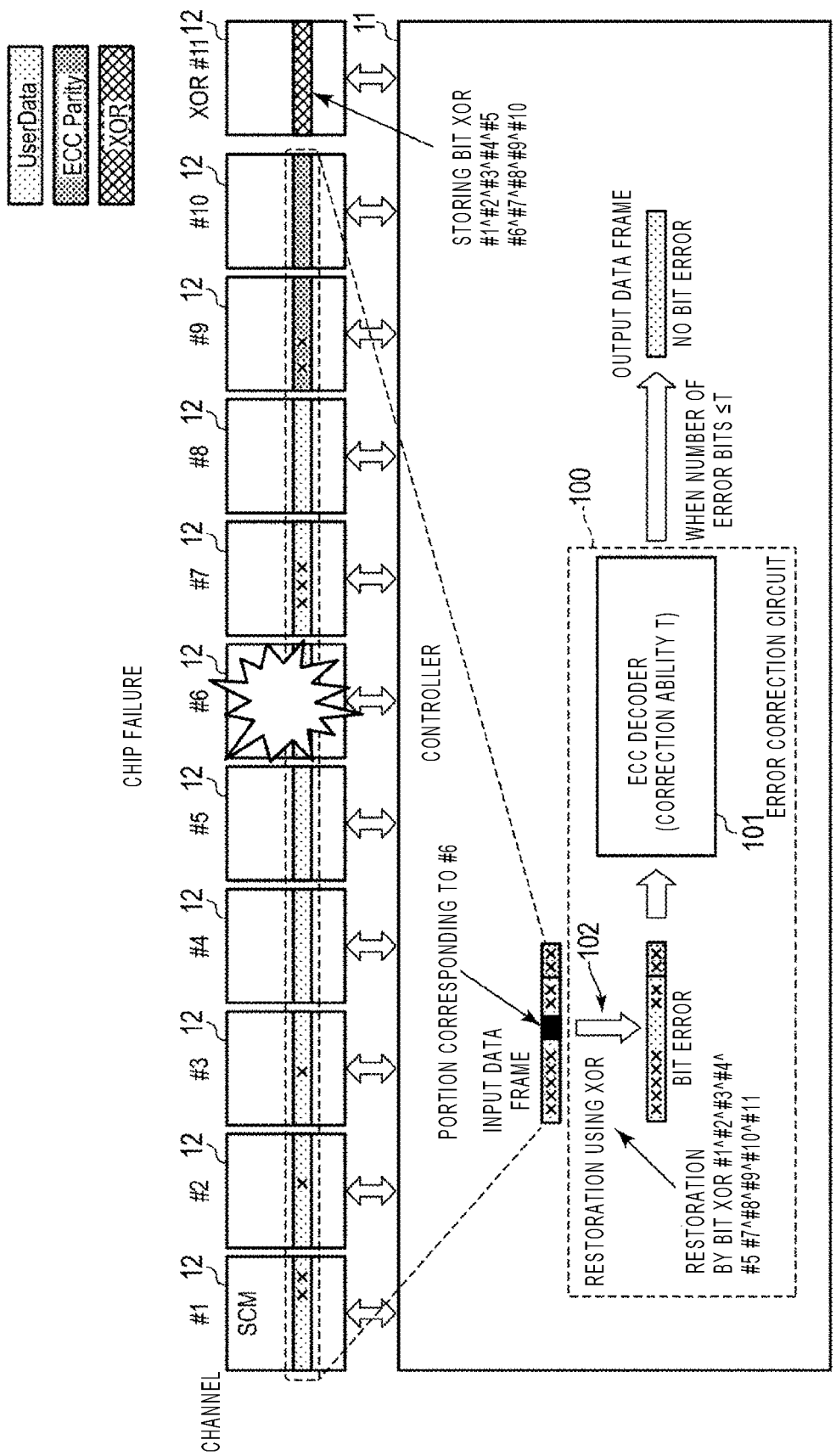
FIG. 6 illustrates a method of writing data in a distributed manner in the memory system according to the first embodiment.
Figure 7:
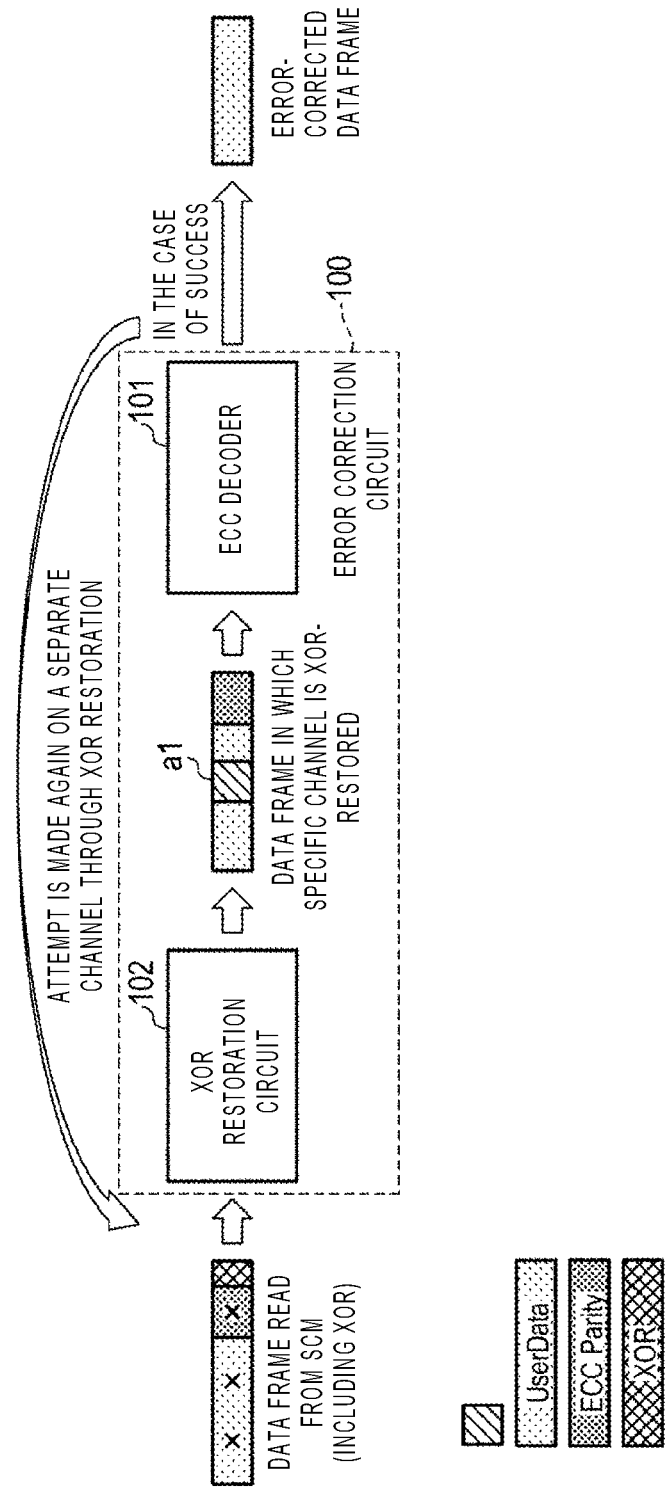
FIG. 7 illustrates repetition of error correction that may occur when non-volatile memory chips on which a data frame is written in a distributed manner are assumed to be failed chips, one by one.

Meanwhile, FIG. 6 illustrates an example where a chip failure occurs in the non-volatile memory chip 12 connected to the channel #6. However, when the failed chip cannot be identified, as illustrated in FIG. 7, the error correction circuit 100 needs to repeat a loop of (1) XOR restoration by the XOR restoration circuit 102, and (2) ECC decoding trial by the ECC decoder 101 ((1)→(2)) until ECC decoding is successful. That is, it is necessary to repeat the above loop of (1)→(2) until the ECC decoding is successful while changing the non-volatile memory chip 12 subjected to the XOR restoration, which is indicated by reference numeral "a1" in FIG. 7. When a data frame is distributed into the 10 non-volatile memory chips 12, there is a possibility that the loop may be repeated 10 times at worst.

Figure 8:
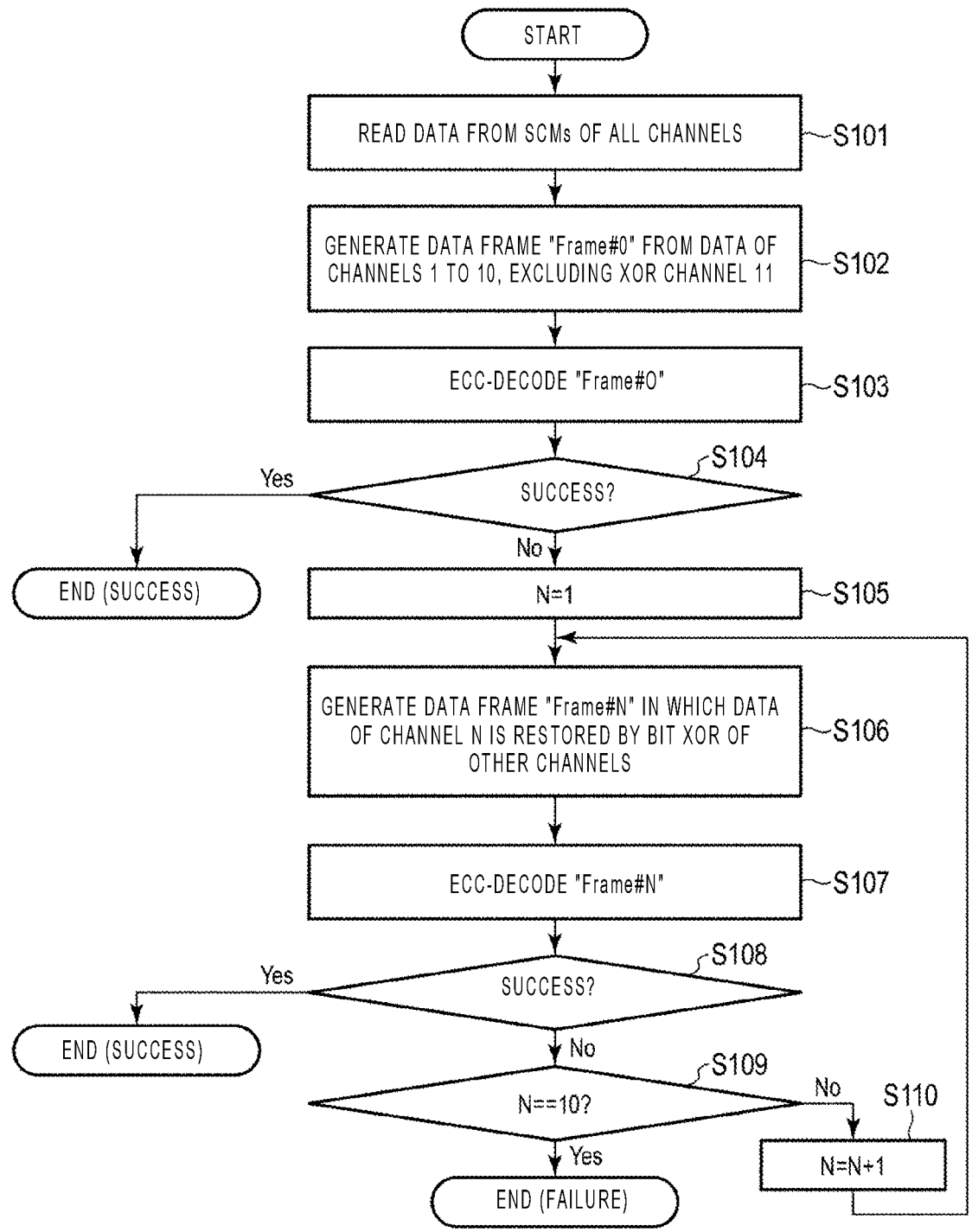
FIG. 8 is a flow chart illustrating an error correction procedure when non-volatile memory chips on which a data frame is written in a distributed manner are assumed to be failed chips, one by one.

FIG. 8 is a flow chart illustrating an error correction procedure when non-volatile memory chips on which a data frame is written in a distributed manner are assumed to be failed chips, one by one. Here, 1 to 10 are channels through which the data frame is written, and 11 is a channel through which an XOR parity is written.

The error correction circuit 100 reads data from the SCMs 12 of all the channels (S101). The error correction circuit 100 generates a data frame "Frame #0" from the data of the channels 1 to 10, excluding the XOR channel 11 (S102). The error correction circuit 100 performs ECC decoding on the corresponding generated "Frame #0" (S103). When the ECC decoding of the "Frame #0" is successful (S104: Yes), the error correction circuit 100 terminates the corresponding error correction process on the assumption that the error correction is successful.

When the ECC decoding of the "Frame #0" is failed (S104: No), the error correction circuit 100 first sets data of the channel 1 as a restoration target (S105), and generates a data frame "Frame #N" in which data of a channel N (initially 1) as the restoration target is restored by bit XOR of the other channels (S106). The error correction circuit 100 performs ECC decoding on the corresponding generated "Frame #N" (S107). When the ECC decoding of the "Frame #N" is successful (S108: Yes), the error correction circuit 100 terminates the corresponding error correction process on the assumption that the error correction is successful.

When the ECC decoding of the "Frame #N" is failed (S108: No), the error correction circuit 100 determines whether the restoration target is data of the channel 10 (S109). When the restoration target is not the data of the channel 10 (S109: No), after increment by one restoration target channel (S110), the process of S106 to S108 is repeated. Meanwhile, when the restoration target is the data of the channel 10 (S109: Yes), the error correction circuit 100 terminates the corresponding error correction process on the assumption that the error correction is failed.

As described above, when one of the non-volatile memory chips is assumed to be a failed chip, one by one, a loop of (1) XOR restoration by the XOR restoration circuit 102, and (2) ECC decoding trial by the ECC decoder 101 ((1)→(2)) is repeated until ECC decoding is successful. This repetition of the loop may increase the latency at reading of data.

Figure 9:
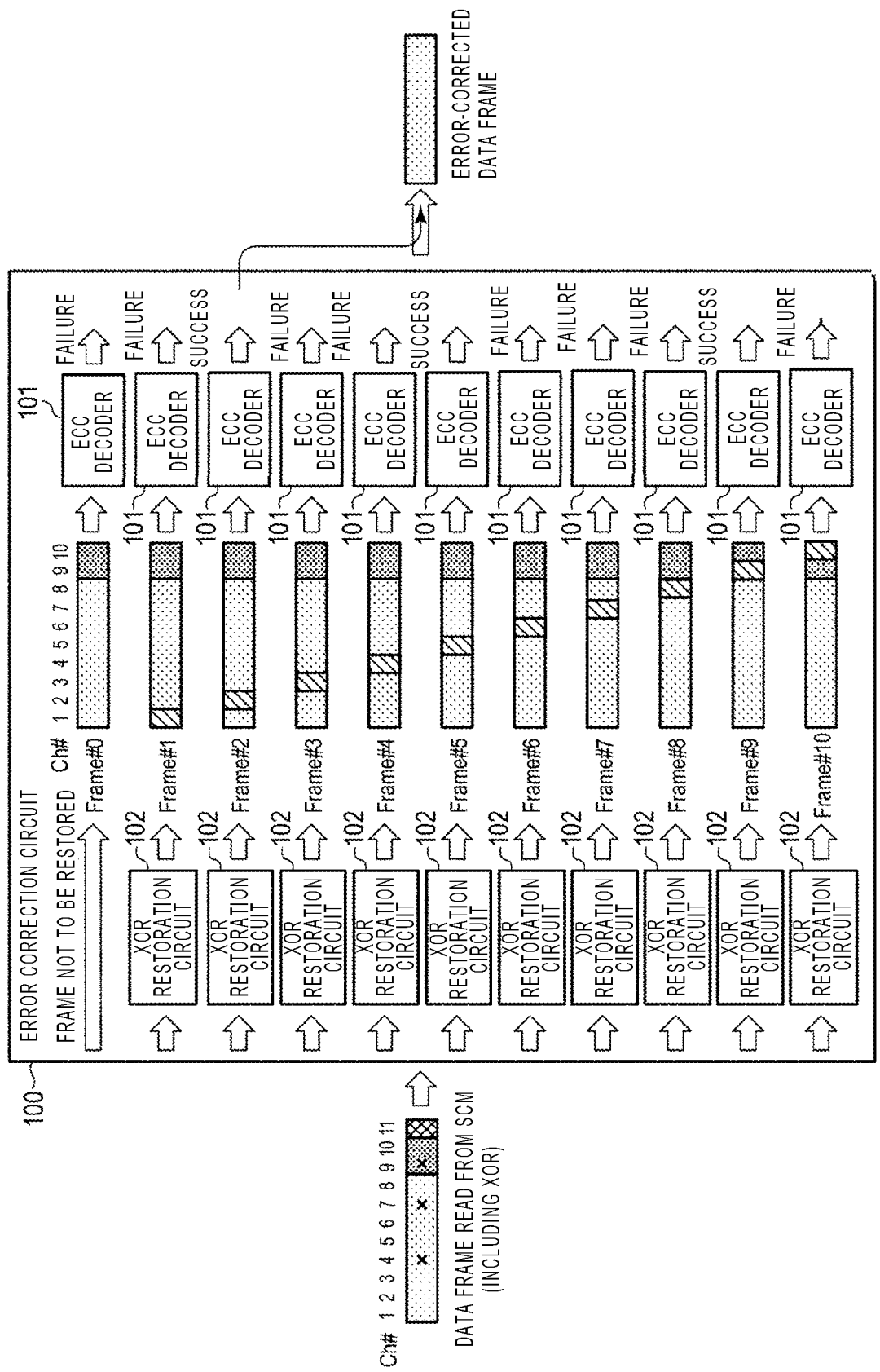
FIG. 9 illustrates a configuration example of an error correction circuit in the memory system according to the first embodiment.

In order to eliminate the above-described loop, in the memory system 1 according to the first embodiment, the error correction circuit 100 performs ECC decoding on a plurality of data frames that may be corrected, in a parallel manner without identifying a failed chip. FIG. 9 illustrates a configuration example of the error correction circuit 100 in the memory system 1 according to the first embodiment.

As illustrated in FIG. 9, for example, in correspondence with writing a data frame into channels #1 to #10 in a distributed manner, the error correction circuit 100 of the memory system 1 according to the first embodiment includes 10 XOR restoration circuits 102 for performing XOR restoration on data of each channel. The error correction circuit 100 includes a total of 11 ECC decoders 101, that is, one ECC decoder 101 that performs ECC decoding on a data frame "Frame #0" generated from data of the channels #1 to #10, and 10 ECC decoders 101 that perform ECC decoding on a data frame "Frame #N" in which data of any of the channels is restored by the XOR restoration circuit 102.

The error correction circuit 100, which includes the corresponding 10 XOR restoration circuits 102 and the corresponding 11 ECC decoders 101, executes error correction on 11 data frames "Frames #0 to #10" in a parallel manner. When the error correction is successful for any one of the data frames, the error correction circuit 100 outputs the data frame.

Figure 10:
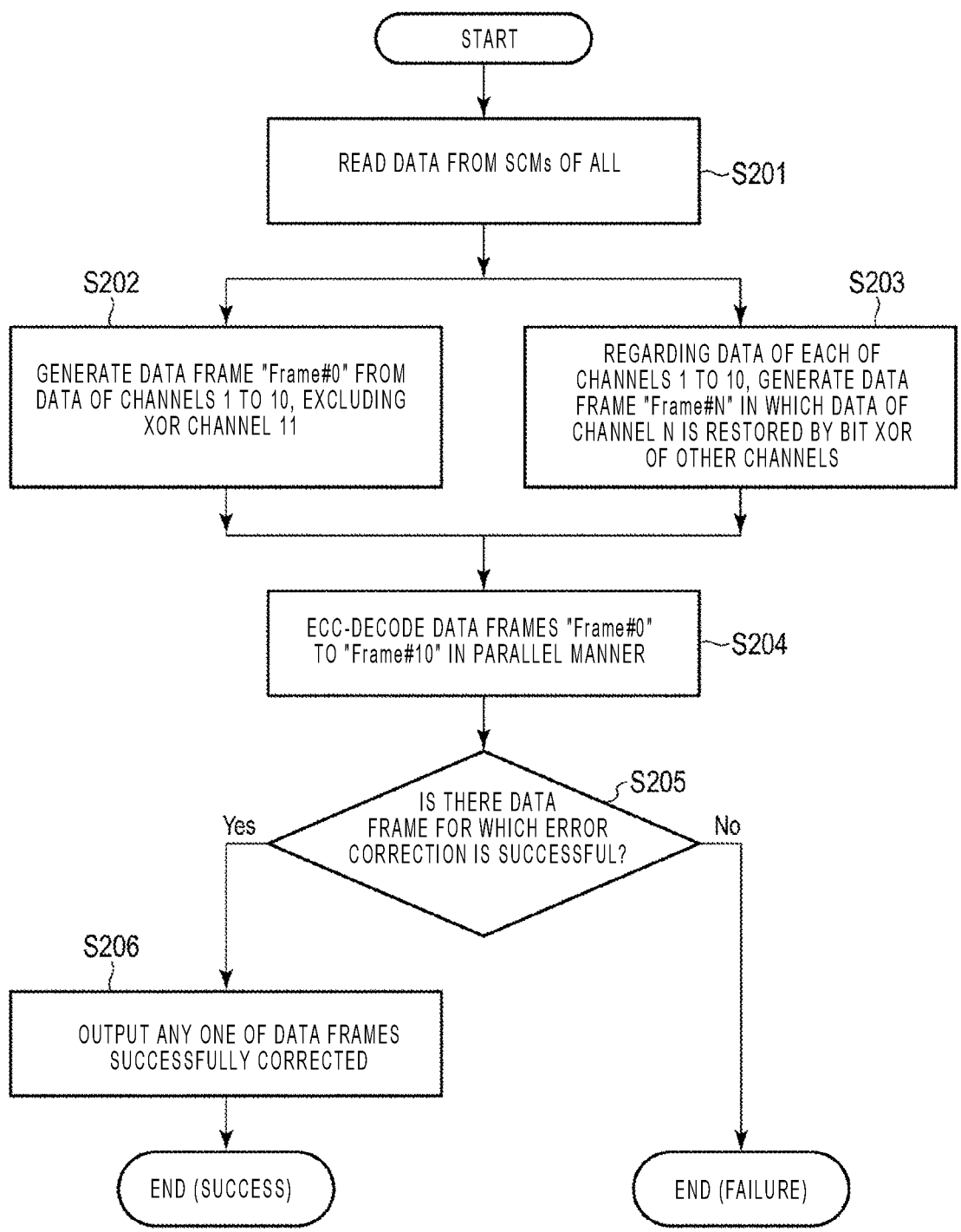
FIG. 10 is a flow chart illustrating an error correction procedure by the error correction circuit of the memory system according to the first embodiment.

FIG. 10 is a flow chart illustrating an error correction procedure by the error correction circuit 100 of the memory system 1 according to the first embodiment.

The error correction circuit 100 reads data from the SCMs 12 of all the channels (S201). The error correction circuit 100 generates a data frame "Frame #0" from the data of the channels 1 to 10, excluding the XOR channel 11 (S202). Regarding data of each of the channels 1 to 10, the error correction circuit 100 generates a data frame "Frame #N" in which data of a channel N is restored by bit XOR of the other channels (S203).

The error correction circuit 100 performs ECC decoding on the data frames "Frame #0" to "Frame #10" in a parallel manner (S204). The error correction circuit 100 determines whether there is a data frame for which error correction is successful (S205). When it is determined that there is a data frame for which error correction is successful (S205: Yes), the error correction circuit 100 outputs any one of data frames for which the corresponding error correction is successful (S206), and then terminates the corresponding error correction process on the assumption that the error correction is successful. Meanwhile, when it is determined that there is no data frame for which error correction is successful (S205: No), the error correction circuit 100 terminates the corresponding error correction process on the assumption that the error correction is failed.

Accordingly, in the memory system 1 according to the first embodiment, since the above-described loop for identifying the failed chip is eliminated, it is possible to implement data error correction capable of coping with a chip failure while maintaining low latency.

However, for example, as illustrated in FIG. 9, the error correction circuit 100, which includes the 10 XOR restoration circuits 102 and the 11 ECC decoders 101, increases in the circuit scale. As the circuit scale of the error correction circuit 100 increases, for example, the chip area of the controller 11 implemented as a SoC increases. Further, the increase of the chip area of the controller 11 leads to an increase in the cost of the memory system 1.

In order to address such an issue, the error correction circuit 100 of the memory system 1 according to the first embodiment may be further configured to prevent the increase of the circuit scale. Next, this point will be described in detail.

There are various coding methods for ECC decoding. In the memory system 1 according to the first embodiment, as an example, the ECC decoder 101 of the error correction circuit 100 employs a Bose-Chaudhuri-Hocquenghem (BCH) code. Descriptions will be made on the outline of BCH code decoding, with reference to FIG. 11.

Figure 11:
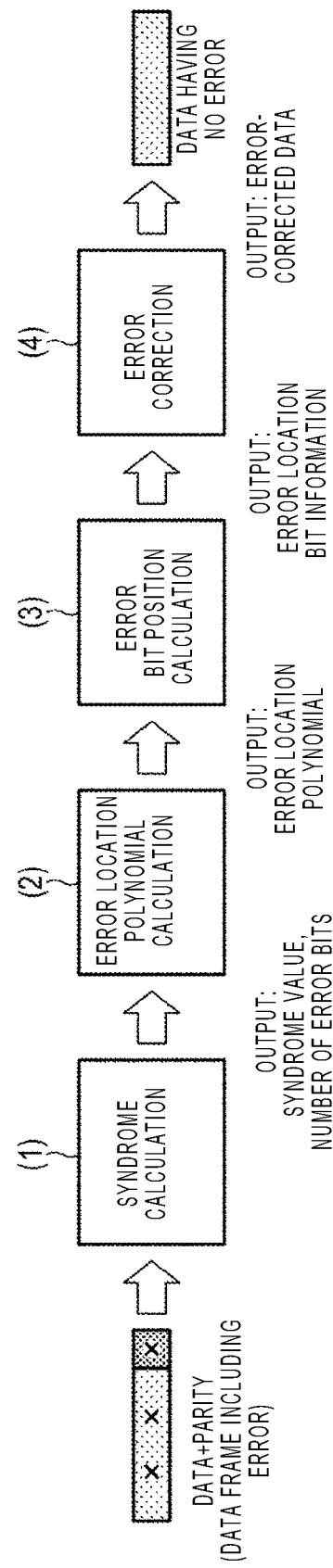
FIG. 11 illustrates an outline of BCH code decoding.

As illustrated in FIG. 11, the BCH code decoding is executed through four steps (1) to (4), that is, (1) syndrome calculation, (2) error location polynomial calculation, (3) error bit position calculation, and (4) error correction.

In (1) syndrome calculation, syndrome calculation is performed with respect to a data frame, and a plurality of syndrome values is output. When all the syndrome values are 0, it is determined that there is no error bit. When any of the syndrome values is not 0, it is determined that there is an error bit. From the number of syndrome values which are not 0, it is possible to determine the number of error bits. The syndrome value may be easily obtained by bit shift and XOR multiplication, and a circuit scale and a latency also tend to be small.

In (2) error location polynomial calculation, error location polynomials are obtained from the syndrome values obtained from the syndrome calculation. As for a specific algorithm, a Berlekamp-Massey method is used in many cases. This process needs to be repeated as many times as the number of error bits. Since the amount of calculation at one time is small, a circuit scale is small. However, a latency tends to be high due to iterative processing.

In (3) error bit position calculation, an actual error bit position is obtained by calculating the root of an error location polynomial. As for a specific algorithm, a Chien search method is used in many cases. Since this process performs round-robin calculation on all bits, the amount of calculation becomes enormous. To perform the error bit position calculation with a low latency, it is necessary to increase the number of bits processed at one time (to increase the number in parallel calculation), and thus a circuit scale tends to increase.

In (4) error correction, an error of the obtained error bit position is corrected. In general, since it is only necessary to invert the bit at the error location, both a circuit scale and a latency are negligibly small.

Therefore, relationships between a circuit scale and a latency in each step of the BCH code decoding are summarized as follows.

(1) syndrome calculation circuit scale: small, latency: low (2) error location polynomial calculation circuit scale: small, latency: high (3) error bit position calculation circuit scale: large, latency: low (4) error correction circuit scale: small, latency: low These are merely tendencies, and vary depending on design parameters. Meanwhile, in a configuration where decoding is performed with a low latency, in certain cases, the circuit scale of (3) the error bit position calculation may reach nearly 90% of the entire circuit scale of the BCH code decoding.

Figure 12:
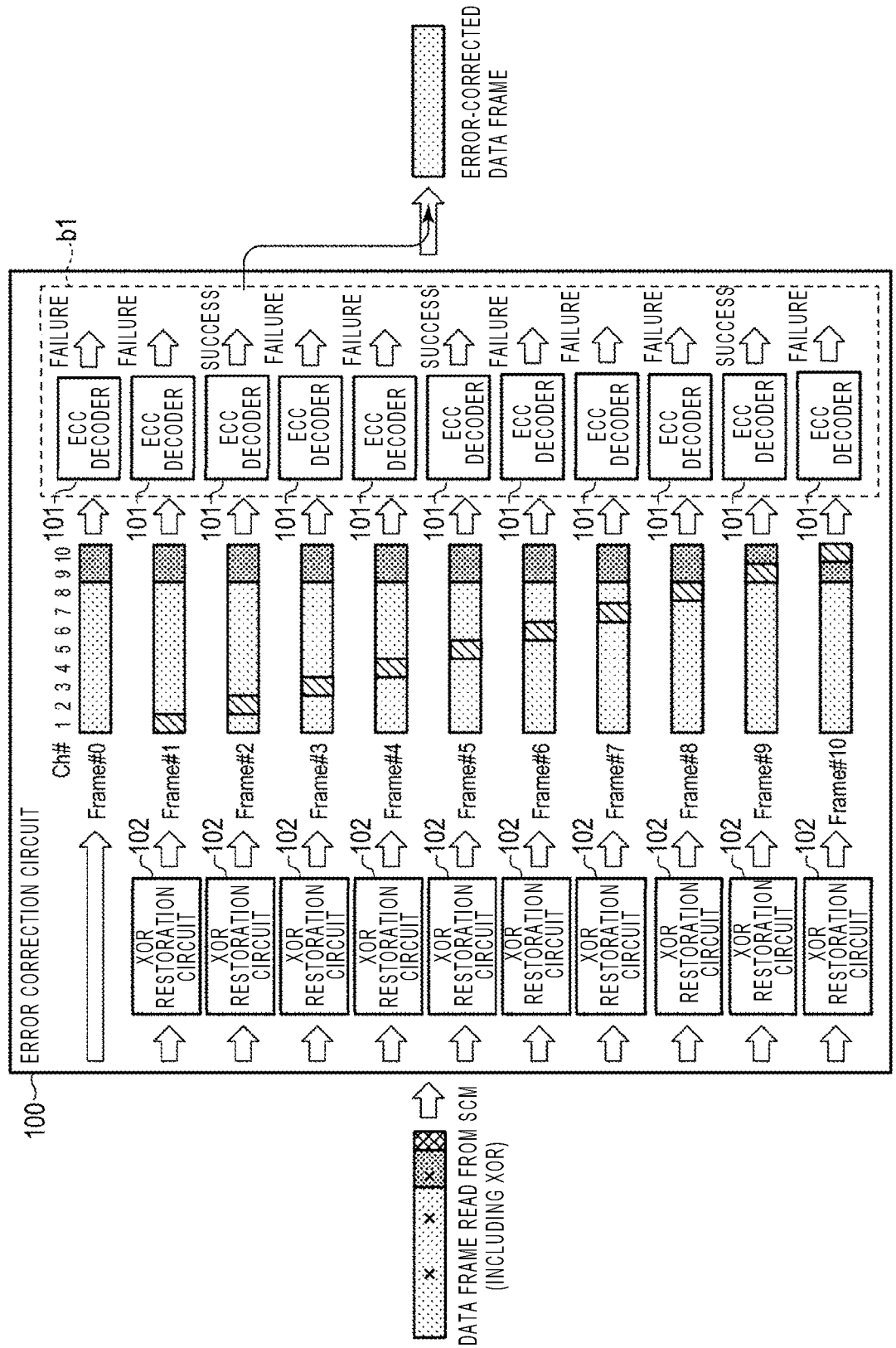
FIG. 12 illustrates an improved portion in the error correction circuit for preventing an increase of a circuit scale, in the memory system according to the first embodiment.

In consideration of the relationships between the circuit scale and the latency in each step of the BCH code decoding, the error correction circuit 100 of the memory system 1 according to the first embodiment has a configuration with a reduced circuit scale. Specifically, in relation to a configuration example of the error correction circuit 100 of FIG. 9, a portion of the ECC decoders 101 indicated by reference numeral "b1" in FIG. 12 is improved.

Figure 13:
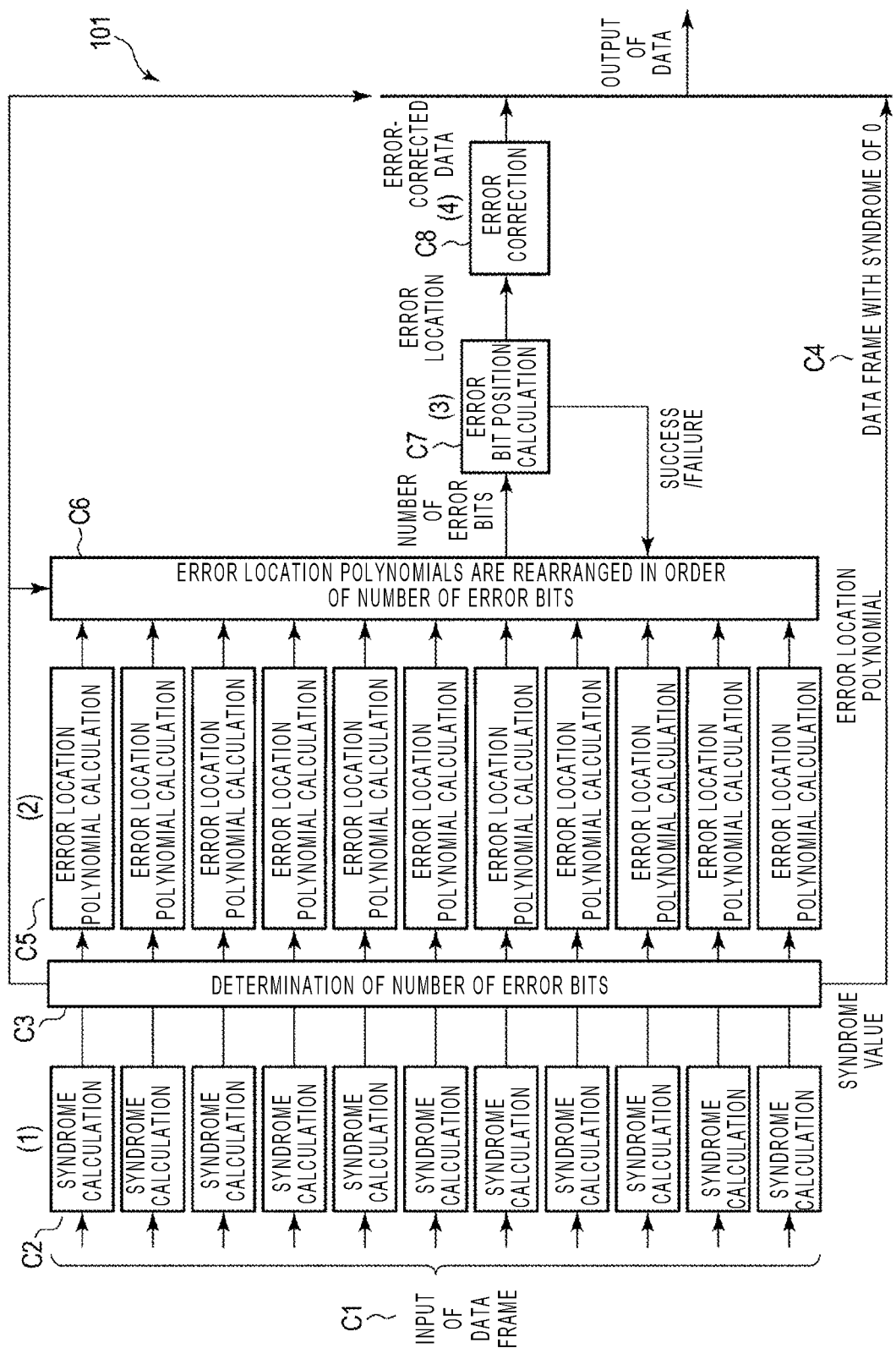
FIG. 13 illustrates a configuration example of the error correction circuit which is improved to prevent an increase of a circuit scale in the memory system according to the first embodiment.

FIG. 13 illustrates a configuration example of the error correction circuit 100 in which the portion of the ECC decoders 101 is improved.

As illustrated in FIG. 13, the ECC decoder 101 is configured to execute only (1) the syndrome calculation, and (2) the error location polynomial calculation in a parallel manner among four steps of the BCH code decoding, that is, steps which tend to require a small circuit scale. (3) The error bit position calculation and (4) the error correction subsequent to (3), which tend to require a large circuit scale, are sequentially executed. Since improvement is made such that sequential execution of (3) the error bit position calculation tending to require a large circuit scale is performed, an increase in the circuit scale of the error correction circuit 100 is prevented. Since (3) the error bit position calculation and (4) the error correction tend to cause a low latency, the influence of sequential execution of these is limited. Meanwhile, parallel execution of (2) the error location polynomial calculation tending to cause a high latency is maintained. Hereinafter, descriptions will be made on the operation of the ECC decoder 101 in which such an improvement is made.

The ECC decoder 101 inputs all data frames that may be corrected successfully, in a parallel manner (C1). The ECC decoder 101 calculates syndrome values on all the data frames in a parallel manner (C2). The ECC decoder 101 calculates numbers of error bits on all the syndrome values (C3). When a valid number of error bits is not obtained, the correction is failed herein. When a data frame with a syndrome value of 0 is found, the data frame is output without error correction and the process ends (C4).

When a data frame with a syndrome value of 0 is not found while a valid number of error bits is obtained, the ECC decoder 101 calculates error location polynomials on all the syndrome values in a parallel manner (C5). Then, the ECC decoder 101 rearranges the error location polynomials in ascending order of the number of error bits (C6). The ECC decoder 101 calculates an error bit position by using an error location polynomial with the smallest number of error bits (C7). When there is no contradiction in the calculated error bit position, the ECC decoder 101 performs error correction on the basis of the obtained error bit position (C8), and outputs the data, and then the process ends.

Meanwhile, when an error bit position cannot be calculated or there is any contradiction in the calculated error bit position, the ECC decoder 101 recalculates an error bit position by using an error location polynomial with the next smallest number of error bits (C7). When there is no uncalculated error location polynomial, the correction is failed.

Figure 14:
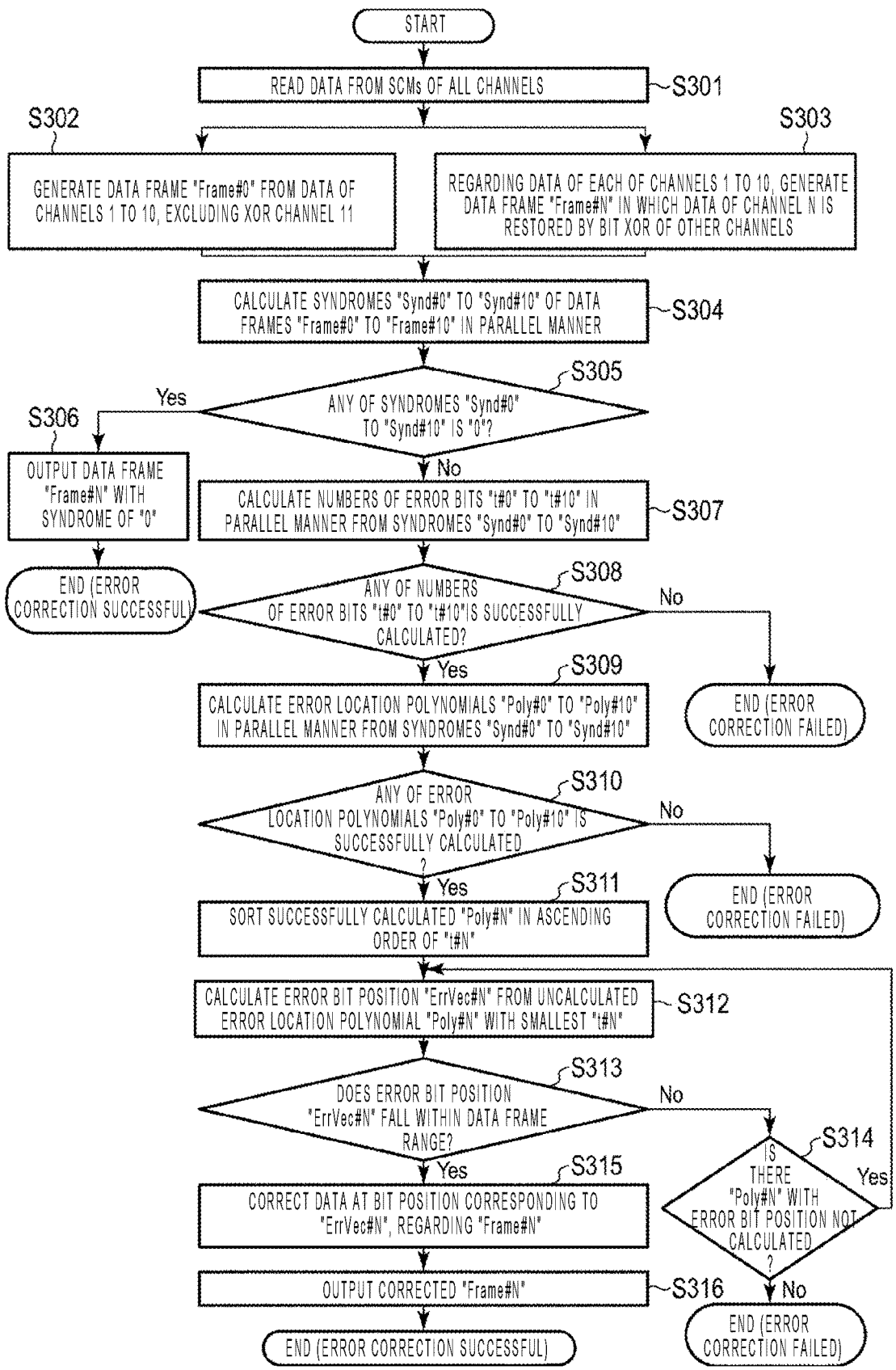
FIG. 14 is a flow chart illustrating an error correction procedure by the error correction circuit which is improved to prevent an increase of a circuit scale in the memory system according to the first embodiment.

FIG. 14 is a flow chart illustrating an error correction procedure by the error correction circuit 100 in which the portion of the ECC decoder 101 is improved.

The error correction circuit 100 reads data from the SCMs 12 of all the channels (S301). The error correction circuit 100 generates a data frame "Frame #0" from the data of the channels 1 to 10, excluding the XOR channel 11 (S302). Regarding data of each of the channels 1 to 10, the error correction circuit 100 generates a data frame "Frame #N" in which data of a channel N is restored by bit XOR of the other channels (S303).

The error correction circuit 100 calculates syndromes "Synd #0" to "Synd #10" of the data frames "Frame #0" to "Frame #10", in a parallel manner (S304). The error correction circuit 100 determines whether any of the syndromes "Synd #0" to "Synd #10" is 0 (S305). When it is determined that any one is 0 (S305: Yes), the error correction circuit 100 outputs a data frame "Frame #N" with a syndrome of 0 (S306).

When it is determined that none of the syndromes "Synd #0" to "Synd #10" is 0 (S305: No), the error correction circuit 100 calculates numbers of error bits "t #0" to "t #10" in a parallel manner from the syndromes "Synd #0" to "Synd #10", respectively (S307). The error correction circuit 100 determines whether any of the numbers of error bits "t #0" to "t #10" is successfully calculated (S308). When it is determined that there is no successful calculation (S308: No), the error correction circuit 100 terminates the corresponding error correction process on the assumption that the error correction is failed.

When it is determined that any of the numbers of error bits "t #0" to "t #10" is successfully calculated (S308: Yes), the error correction circuit 100 calculates error location polynomials "Poly #0" to "Poly #10" in a parallel manner from the syndromes "Synd #0" to "Synd #10", respectively (S309). The error correction circuit 100 determines whether any of the error location polynomials "Poly #0" to "Poly #10" is successfully calculated (S310). When it is determined that there is no successful calculation (S310: No), the error correction circuit 100 terminates the corresponding error correction process on the assumption that the error correction is failed.

When it is determined that any of the error location polynomials "Poly #0" to "Poly #10" is successfully calculated (S310: Yes), the error correction circuit 100 sorts the successfully calculated error location polynomials "Poly #N" in ascending order of the number of error bits "t #N" (S311). The error correction circuit 100 calculates an error bit position "ErrVec #N" from an uncalculated error location polynomial "Poly #N" with the smallest number of error bits "t #N" (S312).

The error correction circuit 100 determines whether the error bit position "ErrVec #N" falls within a data frame range (S313). When it is determined that the error bit position "ErrVec #N" is not within the data frame range (S313: No), the error correction circuit 100 determines whether there is an error location polynomial "Poly #N" for which the error bit position is has not been calculated (S314). In the case of being determined as absence (S314: No), the error correction circuit 100 terminates the corresponding error correction process on the assumption that the error correction is failed. In the case of being determined as presence (S314: Yes), the error bit position "ErrVec #N" is recalculated from the corresponding error location polynomial "Poly #N" (S312).

Meanwhile, when it is determined that the error bit position "ErrVec #N" falls within the data frame range (S313: Yes), the error correction circuit 100 corrects data at a bit position corresponding to the error bit position "ErrVec #N", regarding the data frame "Frame #N" (S315). Then, the error correction circuit 100 outputs the corresponding corrected data frame "Frame #N" (S316), and terminates the corresponding error correction process on the assumption that the error correction is successful.

FIGS. 15A and 15B illustrate an estimate of the latency required for error correction in the worst case.

FIG. 15A illustrates a case where under the assumption of a failed chip, XOR calculation [XOR], and BCH code decoding, that is, (1) syndrome calculation [SYND], (2) error location polynomial calculation [ELP] and (3) error bit position calculation [CS], are sequentially and cyclically executed. Meanwhile, FIG. 15B illustrates a case where a failed chip is not identified, and an attempt of error correction is made on all data frames for which error correction may be successful, in a parallel manner. In this case, XOR calculation [XOR], and BCH code decoding, that is, all of (1) syndrome calculation [SYND], (2) error location polynomial calculation [ELP] and (3) error bit position calculation [CS], are executed in a parallel manner.

For example, assuming that latencies required for individual calculations are 1 cycle (=XOR calculation), 5 cycles (=syndrome calculation), 25 cycles (=error location polynomial calculation), and 5 cycles (=error bit position calculation), the latency in FIG. 15A in the worst case becomes 396 cycles (=(1+5+25+5)×11). Meanwhile, the latency in the case of FIG. 15B always becomes 36 cycles (=1+5+25+5).

Figure 16A:
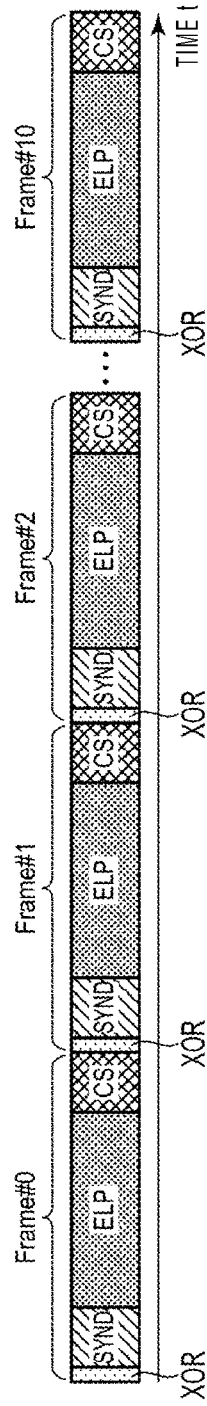
FIGS. 16A and 16B illustrate another estimate of the latency required for error correction in the worst case.
Figure 16B:
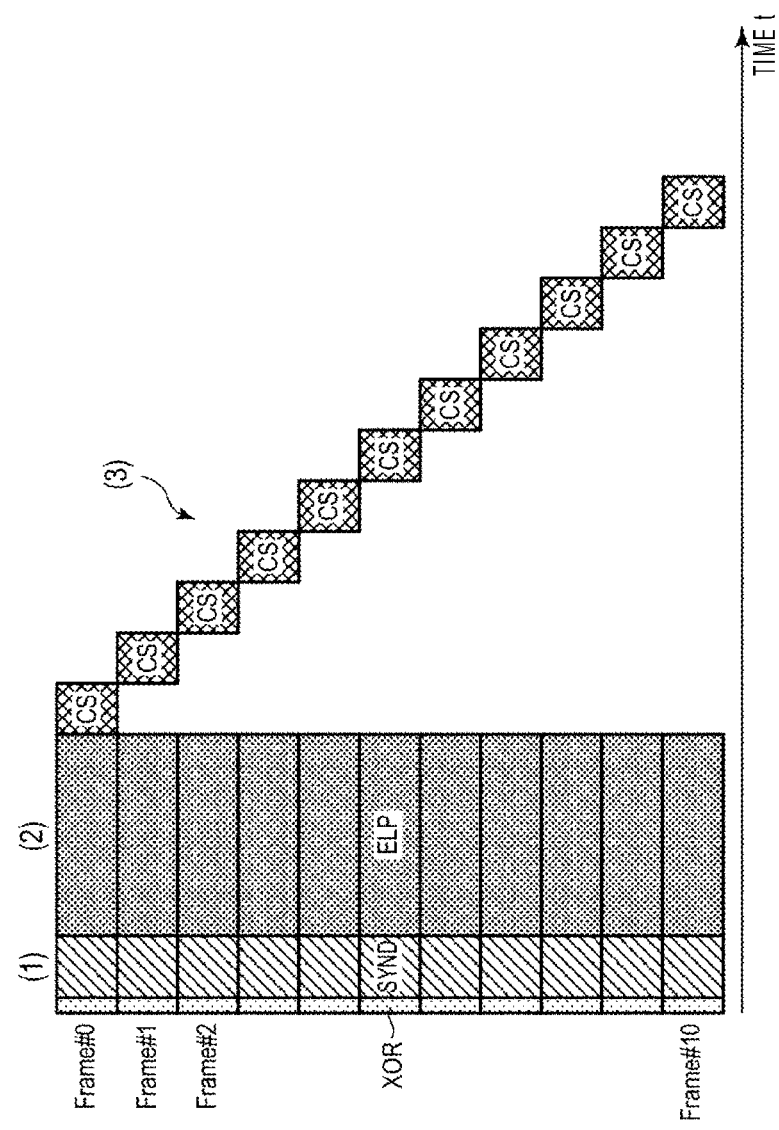

FIGS. 16A and 16B illustrate another estimate of the latency required for error correction in the worst case.

FIG. 16A is the same as FIG. 15A. Meanwhile, FIG. 16B illustrates a case where a failed chip is not identified, and an attempt of error correction is made on all data frames for which error correction may be successful, in a parallel manner. In this case, XOR calculation [XOR], and BCH code decoding, that is, (1) syndrome calculation [SYND] and (2) error location polynomial calculation [ELP], are executed in a parallel manner.

In the same manner as described above, for example, assuming that latencies required for individual calculations are 1 cycle (=XOR calculation), 5 cycles (=syndrome calculation), 25 cycles (=error location polynomial calculation), and 5 cycles (=error bit position calculation), the latency in FIG. 16B in the worst case becomes 86 cycles (=1+5+25+5×11).

FIG. 17 illustrates relationships between the latency and the circuit scale in the case of FIG. 15A, the latency and the circuit scale in the case of FIG. 15B, and the latency and the circuit scale in the case of FIG. 16B. FIG. 17 illustrates an example in which assuming that each of the latency and the circuit scale is 1 in the case of FIG. 15A, the latency and the circuit scale in the case of FIG. 15B and the latency and the circuit scale in the case of FIG. 16B are represented by ratios relative to the latency and the circuit scale in the case of FIG. 15A.

As illustrated in FIG. 17, the latency in item "(B)" is 0.09 relative to 1 in item "(A)", resulting in great improvement in the performance, whereas the circuit scale is 11.0 relative to 1 in item "(A)" and is significantly increased. In contrast, in item "(C)", the latency is 0.22, and the circuit scale is 1.99. In this manner, item "(C)" is practical due to a good balance between the latency and the circuit scale.

As described above, in the memory system 1 according to the first embodiment, the error correction circuit 100 parallelizes only the syndrome calculation and the error location polynomial calculation in consideration of the relationships between the circuit scale and the latency in each step of BCH code decoding. Accordingly, the memory system 1 according to the first embodiment implements data error correction capable of coping with chip failure while maintaining a low latency without causing a cost increase accompanying an increase in the circuit scale.

Second Embodiment

Next, a second embodiment will be described. An example is illustrated where the memory system according to the second embodiment is also implemented as the SCM module. The same reference numerals are used for the same elements as those in the first embodiment, and descriptions thereof will be omitted.

Figure 18:
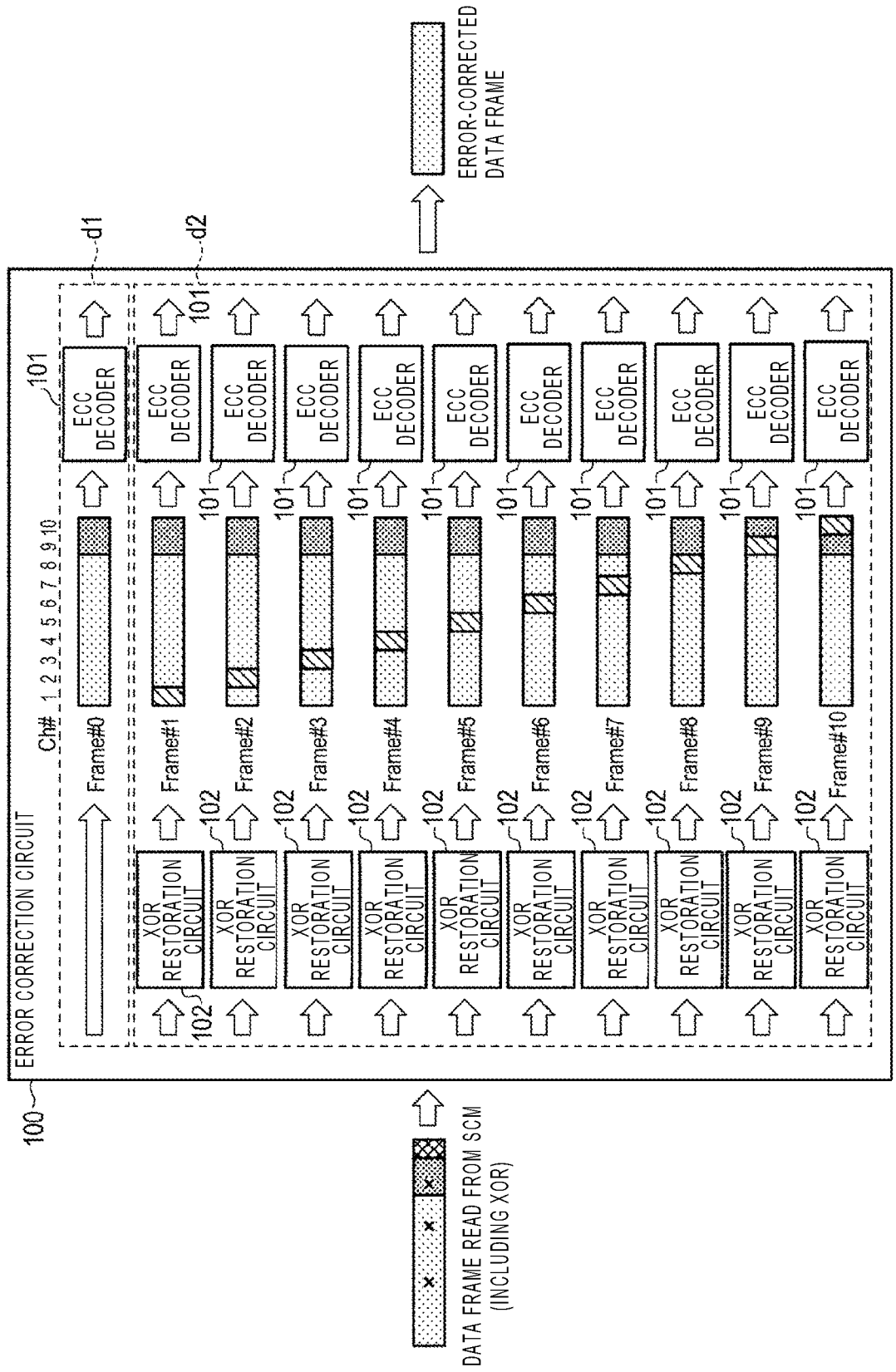
FIG. 18 illustrates an error correction circuit of a memory system according to a second embodiment.

FIG. 18 illustrates an error correction circuit of the memory system 1 according to the second embodiment.

A case where a data frame is restored by using an XOR parity of an XOR channel (for example, the channel #11) and then ECC decoding is performed is a limited case. For that reason, it is wasteful to perform ECC decoding on all data frames for which error correction may be made, every time, for example, from the viewpoint of power consumption or heat generation.

To address such an issue, in the memory system 1 according to the second embodiment, first, the error correction circuit 100 performs ECC decoding on a normal data frame for which XOR restoration is not performed (d1). Then, only when the ECC decoding on the data frame is failed, the error correction circuit 100 performs ECC decoding on all XOR-restored data frames, in a parallel manner (d2).

In the memory system 1 according to the second embodiment, when a chip failure occurs, ECC decoding is performed through two steps of (1) a normal data frame→(2) XOR-restored data frames. Thus, as compared to in the memory system 1 according to the first embodiment, the latency may increase with chip failure, whereas the power consumption or the heat generation may be largely reduced at a normal condition with no chip failure.

Figure 19:
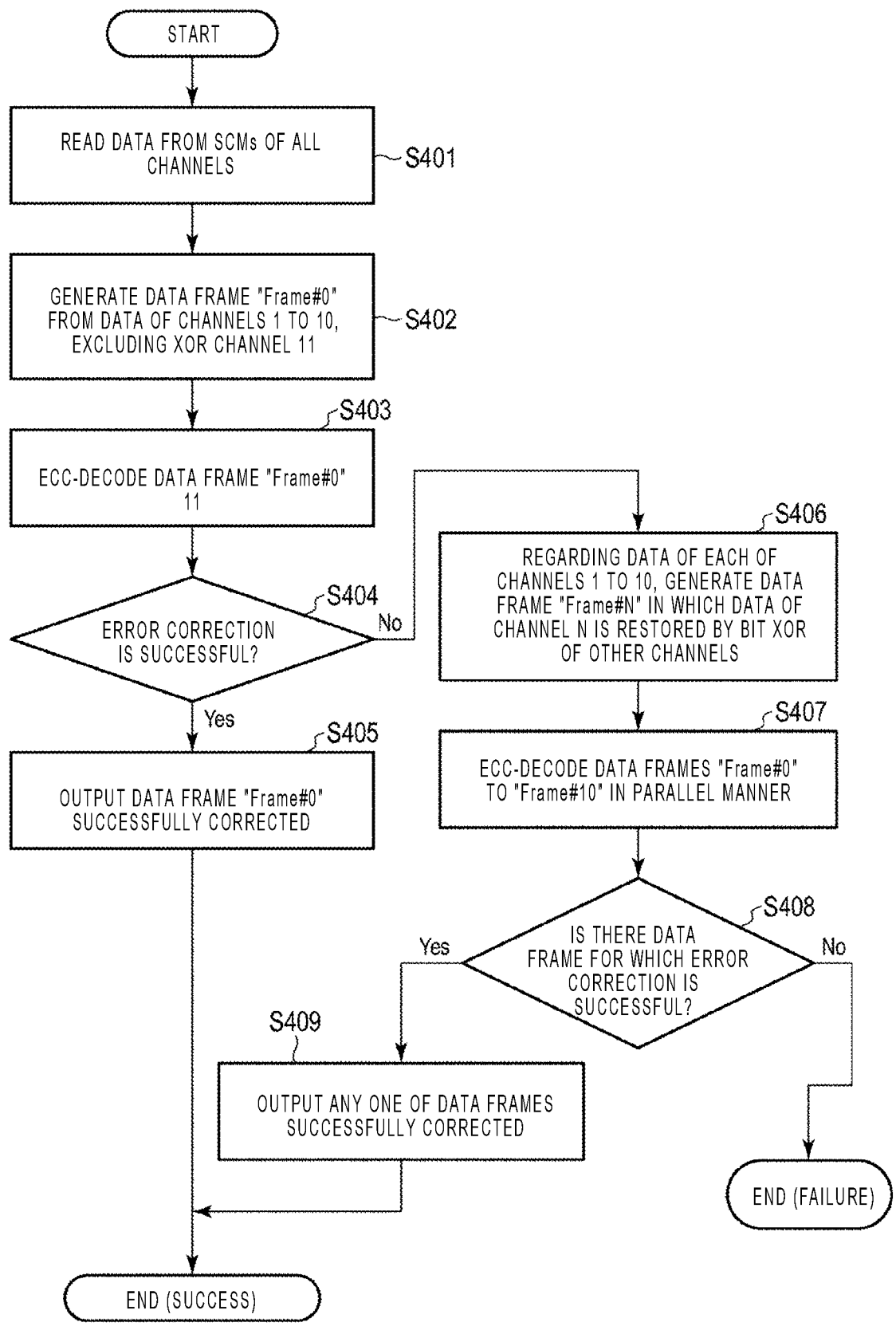
FIG. 19 is a flow chart illustrating an error correction procedure by an error correction circuit of the memory system according to the second embodiment.

FIG. 19 is a flow chart illustrating an error correction procedure by the error correction circuit 100 of the memory system 1 according to the second embodiment.

The error correction circuit 100 reads data from the SCMs 12 of all the channels (S401). The error correction circuit 100 generates a data frame "Frame #0" from the data of the channels 1 to 10, excluding the XOR channel 11 (S402).

The error correction circuit 100 performs ECC decoding on the data frame "Frame #0" (S403). Then, the error correction circuit 100 determines whether error correction of the data frame "Frame #0" is successful (S404). When it is determined that the error correction is successful (S404: Yes), the error correction circuit 100 outputs the corresponding data frame "Frame #0" for which the error correction is successful (S405), and terminates the corresponding error correction process on the assumption that the error correction is successful.

Meanwhile, when it is determined that the error correction of the data frame "Frame #0" is failed (S404: No), regarding data of each of the channels 1 to 10, the error correction circuit 100 generates a data frame "Frame #N" in which data of a channel N is restored by bit XOR of the other channels (S406). Then, the error correction circuit 100 performs ECC decoding on the data frames "Frame #0" to "Frame #10" in a parallel manner (S407). The error correction circuit 100 determines whether there is a data frame for which error correction is successful (S408). When it is determined that there is a data frame for which error correction is successful (S408: Yes), the error correction circuit 100 outputs any one of data frames for which the corresponding error correction is successful (S409), and then terminates the corresponding error correction process on the assumption that the error correction is successful. Meanwhile, when it is determined that there is no data frame for which error correction is successful (S408: No), the error correction circuit 100 terminates the corresponding error correction process on the assumption that the error correction is failed.

In this manner, the memory system 1 according to the second embodiment may implement data error correction capable of coping with chip failure while maintaining a low latency without causing a cost increase accompanying an increase in the circuit scale, and further may largely reduce power consumption or heat generation.

Third Embodiment

Next, a third embodiment will be described. An example is illustrated where the memory system according to the third embodiment is also implemented as the SCM module. The same reference numerals are used for the same elements as those in the first embodiment and the second embodiment, and descriptions thereof will be omitted.

In the memory system 1, in general, power consumption of reading data from the non-volatile memory chip 12 is larger than power consumption of calculation in the controller 11. As mentioned in the second embodiment, a case where a data frame is restored by using an XOR parity of an XOR channel (for example, the channel #11) and ECC decoding is performed thereafter is a limited case. That is, it is highly likely that the XOR parity read from the non-volatile memory chip 12 connected to the XOR channel is not used. That is, reading the XOR parity from the non-volatile memory chip 12 is highly likely to be wasted in many cases.

To address such an issue, in the memory system 1 according to the third embodiment, first, the error correction circuit 100 does not perform reading of an XOR parity, and performs ECC decoding on a data frame read from the non-volatile memory chips 12 connected to the channels, excluding the XOR channel. Then, only when the ECC decoding on the data frame is failed, the error correction circuit 100 performs reading of the XOR parity, and executes XOR restoration and ECC decoding in a parallel manner.

Figure 20:
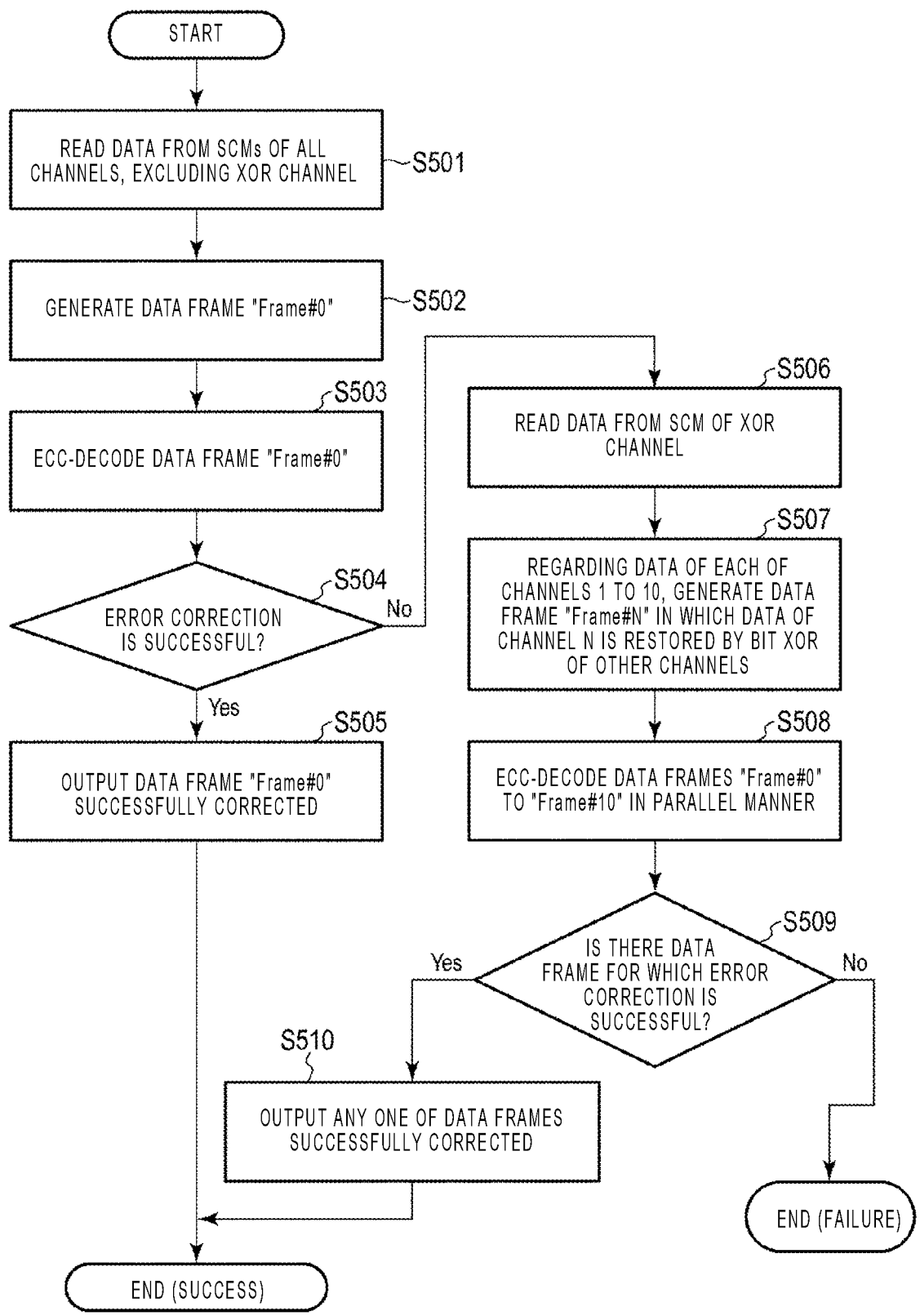
FIG. 20 is a flow chart illustrating an error correction procedure by an error correction circuit of a memory system according to a third embodiment.

FIG. 20 is a flow chart illustrating an error correction procedure by the error correction circuit 100 of the memory system 1 according to the third embodiment.

The error correction circuit 100 reads data from the SCMs 12 of all the channels, excluding the XOR channel (S501), and generates a data frame "Frame #0" (S502). Then, the error correction circuit 100 performs ECC decoding on the data frame "Frame #0" (S503).

The error correction circuit 100 determines whether error correction of the data frame "Frame #0" is successful (S504). When it is determined that the error correction is successful (S504: Yes), the error correction circuit 100 outputs the corresponding data frame "Frame #0" for which the error correction is successful (S505), and terminates the corresponding error correction process on the assumption that the error correction is successful.

When it is determined that the error correction of the data frame "Frame #0" is failed (S504: No), the error correction circuit 100 reads data (XOR parity) from the SCM 12 of the XOR channel (S506). Regarding data of each of the channels 1 to 10, the error correction circuit 100 generates a data frame "Frame #N" in which data of a channel N is restored by bit XOR of the other channels (S507). Then, the error correction circuit 100 performs ECC decoding on the data frames "Frame #0" to "Frame #10" in a parallel manner (S508).

The error correction circuit 100 determines whether there is a data frame for which error correction is successful (S509). When it is determined that there is a data frame for which error correction is successful (S509: Yes), the error correction circuit 100 outputs any one of data frames for which the corresponding error correction is successful (S510), and then terminates the corresponding error correction process on the assumption that the error correction is successful. Meanwhile, when it is determined that there is no data frame for which error correction is successful (S509: No), the error correction circuit 100 terminates the corresponding error correction process on the assumption that the error correction is failed.

In this manner, the memory system 1 according to the third embodiment may further reduce power consumption at a normal condition with no chip failure.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system comprising:
   a plurality of non-volatile memory chips; and
   a controller configured to communicate with a host and control the plurality of non-volatile memory chips, wherein the controller is configured to:
   write a first data frame that includes write data and first parity for error detection and correction of the write data into first memory chips of the non-volatile memory chips in a distributed manner, the first memory chips including N (N is a natural number of two or more) memory chips;
   write second parity used in restoring data stored in one of the N first memory chips, together with data read from the other N-1 of the N first memory chips, into a second memory chip of the non-volatile memory chips that is different from any of the first memory chips;
   generate a first data frame from data read from the first N memory chips;
   generate a second data frame through restoration of data stored in a first one of the first N memory chips with data read from N-1 of the first N memory chips other than the first one and the second parity read from the second non-volatile memory chip; and
   perform at least a part of decoding of the first data frame using the first parity included therein, in parallel with decoding of the second data frame using the first parity included therein.

2. The memory system according to claim 1, wherein the controller comprises:
   N+1 decoding circuits configured to perform decoding of data frames at least partially in parallel with each other.

3. The memory system according to claim 1, wherein the first parity is a Bose-Chaudhuri-Hocquenghem (BCH) code.

4. The memory system according to claim 3, wherein the controller is configured to:
   execute calculation of syndrome values for the first data frame in parallel with calculation of syndrome values for the second data frame;
   execute calculation of error location polynomials for the first data frame in parallel with calculation of error location polynomials for the second data frame; and
   sequentially execute calculation of error bit positions using the error location polynomials for the first data frame and calculation of error bit positions using the error location polynomials for the second data frame.

5. The memory system according to claim 3, wherein the second parity includes a bit XOR of data portions of the data frame that are written into the first N memory chips in the distributed manner.

6. The memory system according to claim 1, wherein the controller is configured to:
perform decoding of the first data frame using the first parity included therein;
determine whether the decoding of the first data frame is successful; and
perform decoding of the second data frame upon determining that the decoding of the first data frame is not successful.

7. The memory system according to claim 1, wherein the controller is configured to:
perform decoding of the first data frame using the first parity included therein;
determine whether the decoding of the first data frame is successful; and
generate the second data frame upon determining that the decoding of the first data frame is not successful.

8. The memory system according to claim 1, wherein the controller is configured to:
perform decoding of the first data frame using the first parity included therein;
determine whether the decoding of the first data frame is successful; and
read the second parity from the second non-volatile memory chip upon determining that the decoding of the first data frame is not successful.

9. The memory system according to claim 1, wherein the non-volatile memory chips are phase-change memories (PCM), magnetoresistive random access memories (MRAM), resistive RAMs (ReRAM), or ferroelectric RAMs (FeRAM).

10. A memory system comprising:
a plurality of non-volatile memory chips; and
a controller configured to communicate with a host and control the plurality of non-volatile memory chips, wherein the controller is configured to:
write a data frame that includes write data and first parity for error detection and correction of the write data into first memory chips of the non-volatile memory chips in a distributed manner, the first memory chips including N (N is a natural number of two or more) memory chips;
write second parity used in restoring data stored in one of the N first memory chips, together with data read from the other N-1 of the N first memory chips, into a second memory chip of the non-volatile memory chips that is different from any of the first memory chips;
generate a first data frame from data read from the first N memory chips;
generate a second data frame through restoration of data stored in a first one of the first N memory chips with data read from N-1 of the first N memory chips other than the first one and the second parity read from the second non-volatile memory chip;
generate a third data frame through restoration of data stored in a second one of the first N memory chips with data read from N-1 of the first N memory chips other than the second one and the second parity read from the second non-volatile memory chip; and
perform at least a part of decoding of the second data frame using the first parity included therein, in parallel with decoding of the third data frame using the first parity included therein.

11. The memory system according to claim 10, wherein the controller comprises:
N restoration circuits configured to perform restoration of data stored in a different one of the first N memory chips with data read from N-1 of the first N memory chips other than the different one, at least partially in parallel with each other.

12. The memory system according to claim 11, wherein the controller comprises:
N+1 decoding circuits configured to perform decoding of data frames at least partially in parallel with each other.

13. The memory system according to claim 10, wherein the first parity is a Bose-Chaudhuri-Hocquenghem (BCH) code.

14. The memory system according to claim 13, wherein the controller is configured to:
execute calculation of syndrome values for the second data frame in parallel with calculation of syndrome values for the third data frame;
execute calculation of error location polynomials for the second data frame in parallel with calculation of error location polynomials for the third data frame; and
sequentially execute calculation of error bit positions using the error location polynomials for the second data frame and calculation of error bit positions using the error location polynomials for the third data frame.

15. The memory system according to claim 14, wherein the controller is configured to:
execute the calculation of error bit positions for the second data frame before the calculation of error bit positions for the third data frame, when a number of error bits in the second data frame obtained from the syndrome values for the second data frame is less than a number of error bits in the third data frame obtained from the syndrome values for the third data frame, and
execute the calculation of error bit positions for the second data frame after the calculation of error bit positions for the third data frame, when the number of error bits in the second data frame is more than a number of error bits in the third data frame.

16. The memory system according to claim 15, wherein when the calculation of error bit positions for the second data frame is successful, the controller does not execute the calculation of error bit positions for the third data frame.

17. The memory system according to claim 13, wherein the second parity includes a bit XOR of data portions of the data frame that are written into the first N memory chips in the distributed manner.

* * * * *